Patented Aug. 18, 1931

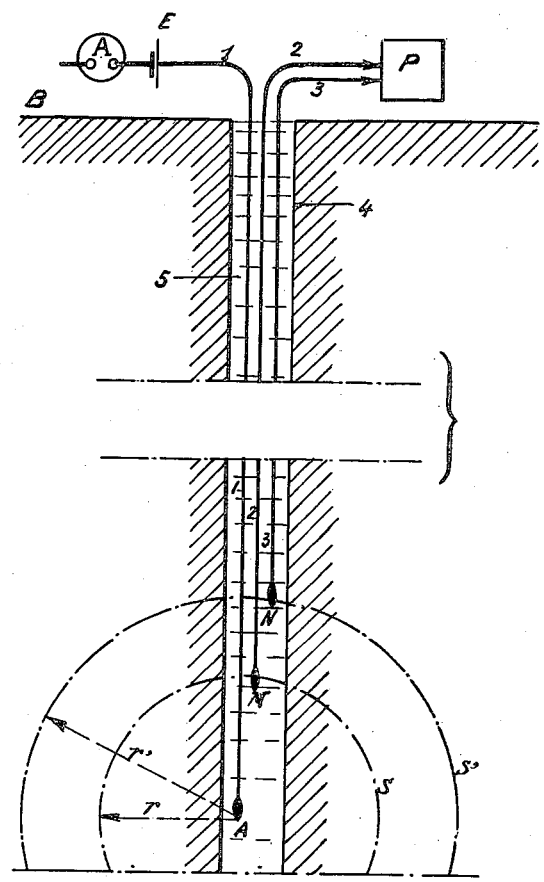

1,819,923

UNITED STATES PATENT OFFICE

CONRAD SCHLUMBERGER, OF PARIS, FRANCE, ASSIGNOR TO SOCIETE DE PROSPECTION ELECTRIQUE PROCEDES SCHLUMBERGER, OF PARIS, FRANCE, A CORPORATION OF FRANCE

ELECTRICAL PROCESS AND APPARATUS FOR THE DETERMINATION OF THE NATURE OF THE GEOLOGICAL FORMATIONS TRAVERSED BY DRILL HOLES

Application filed June 6, 1929, Serial No. 368,882, and in France October 26, 1928.

The present invention relates to an electrical process and an apparatus or system for determining the geological formations traversed in drilling operations without the help of a mechanical coring device, as used up to the present day.

The geological reconnaissance of the ground traversed by a drill hole is made generally by taking cores, i. e., cylindrical samples cut in the rocks by a boring tool, and brought up to the surface. These operations are long, and particularly tedious in modern methods of high speed drilling used in oil-fields.

The present process consists in replacing the mechanical coring by the measurement of the electrical specific resistivity of the different rocks traversed, the measurement taking place inside the drill hole, at different depths. Where the drill hole is provided with a casing, such as the usual metallic casing extending partly down into the drill hole, the different depths at which the measurement takes place would of course begin below such metallic casing. I have discovered that the specific resistivity, i. e., the resistance of a cylinder one centimeter in length and one square centimeter in section, is a parameter which sufficiently characterizes the different rocks so that it is possible to deduct the nature thereof from the figures obtained in the electrical readings. The final results of these measurements taken along a drill hole are given in the form of a diagram of the resistivities of the rocks at different depths. This "electrical log" shows the depth of the geological horizons, such as the top of any given formation.

The invention also relates to an apparatus for carrying out this process. The apparatus consists of a measuring instrument, a potentiometer for example, placed at the surface of the soil, and connected by insulated wires to one or more electrodes, at different depths in the water which normally fills the drill hole. This water ensures by its conductivity the necessary electrical connection between the electrodes and the rock forming the wall of the drill hole. When an electric current is sent to one of the electrodes from any suitable source whose other pole is earthed, it produces by ohmic effect equipotential surfaces around this electrode, between which equipotential surfaces the difference of potential is measured. Knowing this difference of potential between two surfaces, and also the distance from these to the electrode, and the value of the current, the average resistance of the ground around the electrode can be calculated.

In the accompanying drawing is illustrated one example of an apparatus for carrying out the process in accordance with the present invention.

The measuring device comprises three insulated wires, 1, 2, and 3, suspended in a drill hole, and terminating in three electrodes, A, M and N, dipping in the water in the drill hole. The distances $AM=r$, and $AN=r'$, are large in respect to the diameter of the hole; for example, they are 10 to 20 times the diameter of the hole. The electrode A is used for sending the current into the ground. The electrodes M and N are used for measuring the difference of potential produced by ohmic effect between these two points M and N by the passage of current in the ground.

In order to send current into the ground through the electrode A, this electrode is connected by means of the insulated wire 1 to one of the poles of the source of electricity E, at the surface of the soil, and the other pole of E is earthed at B, at any given point, for example near the drill hole. To measure the difference of potential between M and N, these two electrodes are connected by the insulated wires 2 and 3 to the two terminals of a potentiometer P.

Knowing the distances $r$ and $r'$, the value $i$ of the current (which is measured for example by an ammeter $c$), and the difference of potential $\Delta V$ between M and N, which is measured by the potentiometer P, the average resistivity $\rho$ of the rocks in the neighborhood of the measuring device AMN can be calculated.

When the earth is roughly homogeneous in the neighbourhood of AMN, the calculation is made as follows.

The current $i$, flowing from A into the ground, produces by ohmic effect equipotential surfaces surrounding A. These surfaces are, by reason of symmetry, spheres centered at A, provided always that one does not consider: firstly, the region closely surrounding A, where the presence of the hole filled with water and the dimensions of the electrode A cause a certain disturbance; and secondly, the regions remote from A, where the equipotential surfaces are influenced by the electrode B, the non-homogeneous nature of the earth, or the presence of the metallic casing, etc.

In particular the two equipotential surfaces S and S' passing at the points M and N, are approximately spherical, if the dimensions of $r$ and $r'$ are chosen as stated above. These spheres cut the column of water in the drill hole without appreciable deformation because of the extremely small area of cross-section of the hole compared to the distances $r$ and $r'$ or the cross-section of the current path through the said spheres. The measure of potential between the electrodes M and N in the water is then equivalent to a measure made inside the earth at distances $r$ and $r'$ from the electrode A.

The application of Ohm's law to the spheres S and S' of radius of $r$ and $r'$ leads to the following formula:—

$$\rho = \frac{4\pi}{i} \Delta V \frac{r\, r'}{r'-r}$$

which gives the required resistivity $\rho$.

When the earth comprises rocks, which cannot be considered as homogeneous in the neighborhood of the measuring device AMN, the calculations are more complicated, but nevertheless give sufficiently accurate practical results.

The measurement of the resistivity of the rocks inside the drill hole can moreover be made by any other similar electrical device. For example, if only one insulated wire such as 1 be used, it is connected to the electrode A, which is lowered into the drill hole, and to an earth B on the surface. The total resistance R of the following circuit is measured: the cable, the two terminals A and B, and the earth between A and B. This resistance R comprises three parts:—

1. The resistance $R_1$ of the cable, which is measured directly.
2. The contact resistance $R_2$ of the earth connection at B (ground surrounding B) which is also measured directly.
3. The contact resistance $R_3$ of the earth connection at A (ground surrounding A) whose value is represented by the formula $$R_3 = R - (R_1 + R_2).$$

The ground between A and B and remote from these two points is not taken into consideration, as it has a negligible ohmic resistance, owing to the broad section of current tubes therein.

Now $R_3$ is of the form $K\rho$, K being a proportional coefficient which may be calculated a priori from the dimensions of the electrode A. From the value of $R_3$ it is then possible to deduce the desired resistivity $\rho$ of the earth surrounding A.

What I claim is:—

1. An electrical process for determining the nature of the geological formations traversed by drill holes, and which consists in measuring the electrical specific resistivity of the formations encountered at different depths inside the drill hole where said hole contains water.

2. An electrical system for determining the nature of the geological formations traversed by drill holes, comprising electrodes placed in water contained in said drill hole, means for varying the depth of these electrodes in the drill hole, means for measuring the current flowing in the circuit constituted when one of these electrodes is connected by an insulated wire to a source of current whose other pole is earthed, means for measuring the difference of potential thus created between two other of said electrodes, said means being connected by insulated wires to said two electrodes, whereby the resistivity of the earth at the depth of the electrodes can be deduced.

3. An electrical process for determining the nature of geological formations in the neighborhood of a drill hole containing water, which comprises passing an electric current between a point in said water remote from the top of the drill hole and a point near the top of the drill hole, measuring the current flow, measuring the potential between a pair of points in the drill hole in the path of the current at different known depths, and computing from the said measurements the specific resistance of the material included between equipotential spheres centered at one of the points between which the current is passed.

4. The method of electrical coring of a drill hole which comprises measuring the potential between a pair of points in the drill hole during the maintenance of a measured flow of current between two points intermediate of which said points of potential measurement are positioned, and repeating the measurements for different depths of one of said points of potential measurement while maintaining constant the distance between the points of potential measurement and one of the points between which a flow of current is maintained.

In testimony whereof I have signed this specification.

CONRAD SCHLUMBERGER.